United States Patent
Satoh et al.

(10) Patent No.: US 9,429,833 B1
(45) Date of Patent: Aug. 30, 2016

(54) PROJECTION AND CAMERA SYSTEM WITH REPOSITIONABLE SUPPORT STRUCTURE

(71) Applicant: Rawles LLC, Wilmington, DE (US)

(72) Inventors: Juli Anna Maria Satoh, San Jose, CA (US); Robert Allan Yuan, Belmont, CA (US); Navid Poulad, Sunnyvale, CA (US); Kebin Sylvia Wu, San Francisco, CA (US); Jijie Xu, Cupertino, CA (US); Colter Earl Cederlof, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 610 days.

(21) Appl. No.: 13/842,420

(22) Filed: Mar. 15, 2013

(51) Int. Cl.
   *G03B 21/14*   (2006.01)
   *G03B 21/30*   (2006.01)
   *F16M 11/04*   (2006.01)
   *G06F 3/042*   (2006.01)

(52) U.S. Cl.
   CPC ............. *G03B 21/30* (2013.01); *G03B 21/145* (2013.01); *G06F 3/042* (2013.01); *F16M 11/04* (2013.01)

(58) Field of Classification Search
   CPC .... G03B 21/14; G03B 21/145; G03B 21/30; G03B 21/54; F16M 11/04; F16M 11/08; F16M 11/10; F16M 11/12; F16M 11/06

USPC .................................................. 353/119, 122
   See application file for complete search history.

(56) References Cited

U.S. PATENT DOCUMENTS

| | | | |
|---|---|---|---|
| 7,187,343 B2 * | 3/2007 | Pate | 345/1.2 |
| 2002/0131024 A1 * | 9/2002 | Keenan et al. | 353/79 |
| 2005/0128437 A1 * | 6/2005 | Pingali et al. | 353/69 |
| 2012/0223885 A1 | 9/2012 | Perez | |

FOREIGN PATENT DOCUMENTS

WO     WO2011088053 A2     7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

Primary Examiner — William C Dowling
Assistant Examiner — Ryan Howard
(74) Attorney, Agent, or Firm — Lee & Hayes, PLLC

(57) ABSTRACT

A device includes a projection and camera system to create an augmented reality environment in which images are projected onto a scene and user movement within the scene is captured. In one implementation, the projection and camera system are mounted in a movable housing or head that is supported by a repositionable support structure. The housing can be moved to a desired position and then locked into a stationary and stable position for creation of the augmented realty environment.

20 Claims, 11 Drawing Sheets

PROJECTION AND CAMERA SYSTEM WITH REPOSITIONABLE SUPPORT STRUCTURE

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection and imaging systems. Such improvements might include lighter weight, smaller form factors, and less obtrusive integration into the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, depth sensors, audio devices, computing devices with processing and memory capabilities, and so forth. The projectors project images onto the surroundings that define the environment, the depth sensors analyze the scene characteristics, and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment. The architecture may be implemented in many ways. One illustrative implementation is described below in which an augmented reality environment is created within a room. The architecture includes one or more projection and camera systems. Multiple implementations of various projection and camera systems are described. For instance, in one implementation, the projection and camera system is implemented to resemble a common table lamp. In this example implementation, the projector and camera are arranged in a head component of the lamp, and a repositionable support structure is used to position the head component as desired and then lock the head component into a stationary and stable position for creation of the augmented realty environment. However, the various implementations of the architecture described herein are merely representative.

Figure 1:
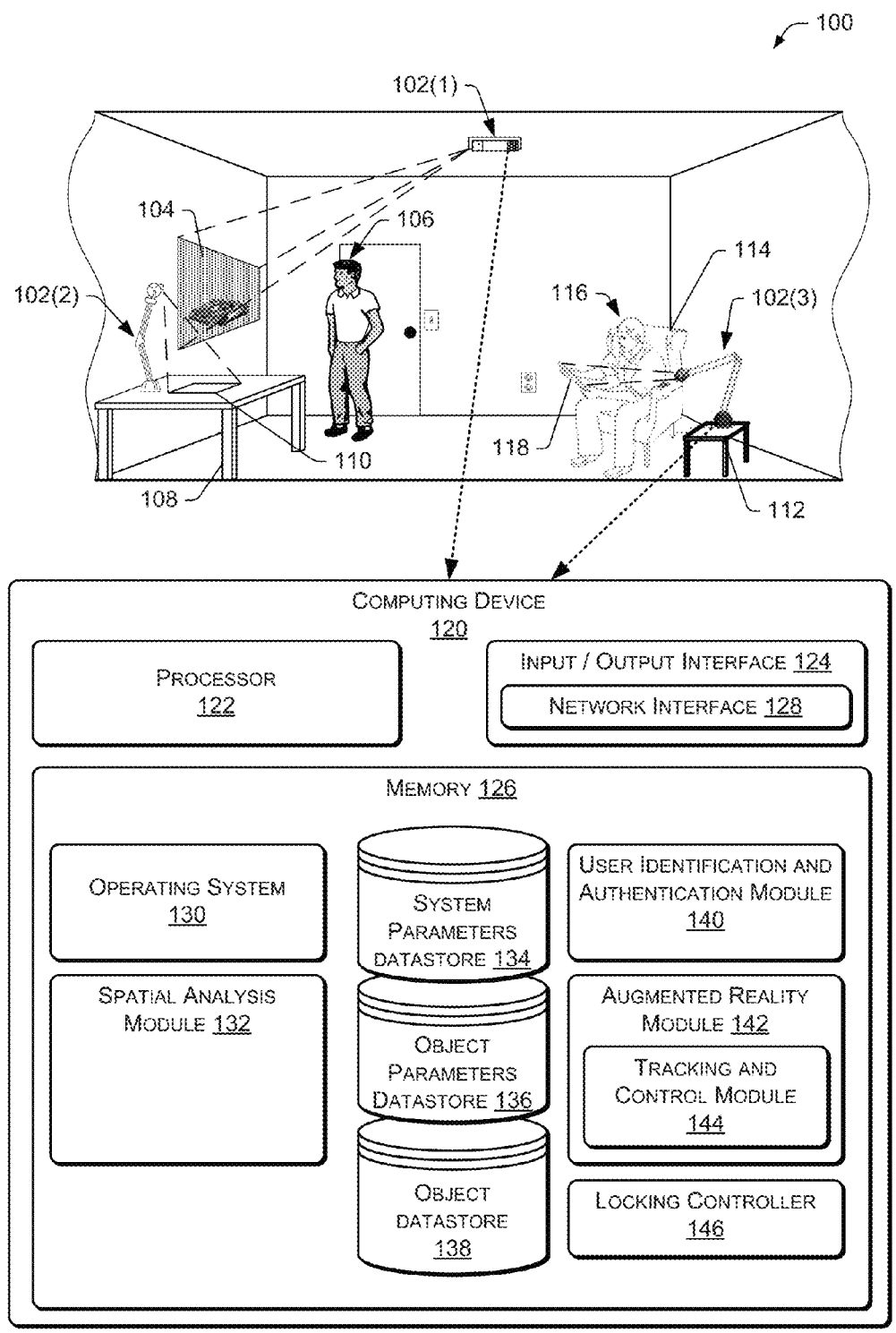
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which is a room in this illustrated scenario. Three augmented reality functional nodes (ARFN) 102(1)-(3) are shown within the room. Each ARFN contains projectors, cameras, depth sensors, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied to resemble a common table lamp, which is shown sitting on a desk 108. In the second ARFN 102(2), the projector, camera, and depth sensor are arranged in a head component supported by a repositionable support structure. The repositionable support structure allows the user to position the projector and camera system in any orientation desired. In this case, the second ARFN 102(2) is oriented to project images 110 onto the surface of the desk 108 for the user 106 to consume and interact. The projected images 110 may be of any number of things, such as homework, video games, news, or recipes.

A third ARFN 102(3) is also embodied to resemble a table lamp, shown sitting on a small table 112 next to a chair 114. The third ARFN 102(3) is also equipped with a repositionable support structure that allows the user to position the projector and camera system in a desired orientation. In FIG. 1, a second user 116 is seated in the chair and is holding a portable projection screen 118. The third ARFN 102(3) is positioned to project images onto a surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations and usage scenarios. In other implementations, one or more ARFNs may be placed around the room in any number of arrangements, such as on in furniture, on the wall, beneath a table, and so forth, and may be positioned to create augmented reality environments anywhere within the room.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light, although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

For implementations involving a repositionable support structure, such as shown in the lamp-resembling ARFNs 102(2) and 102(3), a locking controller 146 provides functionality to detect user intention to move the support structure and to operably release and reset the locking mechanisms that hold the support structure in a stationary and stable position. The locking controller 146 is shown stored as a software module in memory 126 for execution by the processor 122, although the controller may be implemented in firmware, hardware, and/or electrical components (e.g., sensors, switches, etc.). The user may express an intention to move the support structure in any number of ways, including through contact of the support structure, selection of a dedicated switch or button, or a voice command. The locking controller 146 may receive such inputs, and in response, unlock the support structure to permit repositioning of the projector and camera system.

One purpose for locking the support structure is to permit the projection and camera system to track movement of a target surface, such as the surface of the portable screen 118 for the user 116, and continuously move or adjust the projection and camera system as the surface is moved. In one implementation, the ARFN 102(2) and 102(3) may include one or more motors (as described in example implementations below) that continuously reposition the projection and camera system while the support structure is locked. In another implementation, the support structure may be equipped with motors to facilitate the repositioning of the projection and camera system while the ARFN tracks the projection surface, and the locking controller 146 releases the brakes when an adjustment is desired, and then automatically resets the brakes when the adjustment is completed.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

Figure 2:
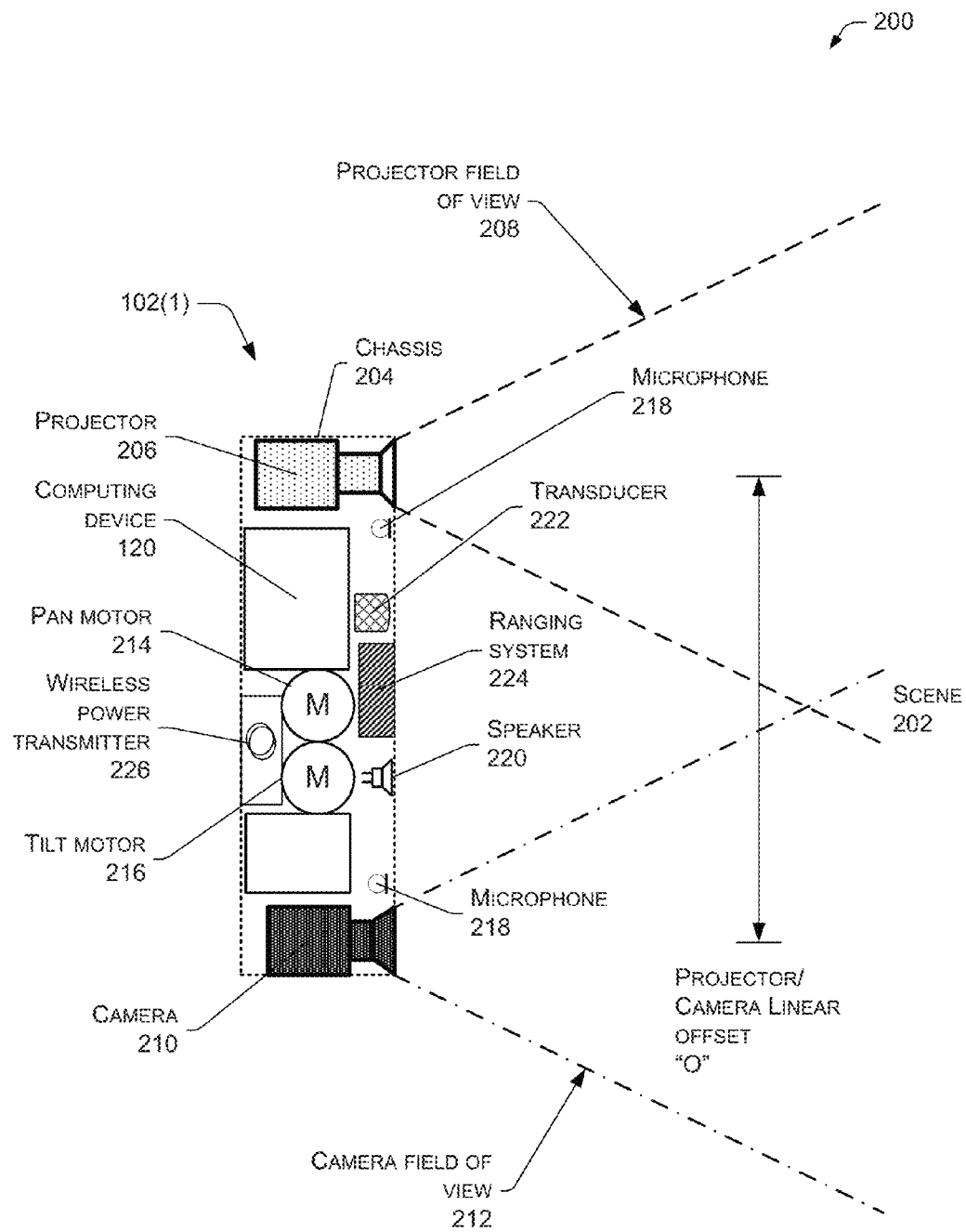
FIG. 2 shows a first implementation of a projection and image capture system formed as an augmented reality functional node having a chassis to hold a projector and camera in spaced relation to one another. In this implementation, the projector and camera have different optic paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like. In some implementations, multiple projectors may be used in the same ARFN.

One or more cameras 210 may also be disposed within the chassis 204. The camera 210 is configured to image the scene in visible light wavelengths, non-visible light wavelengths, or both. The camera 210 may be implemented in several ways. In some instances, the camera may be embodied an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used including, for example, a camera to capture 3D images, a camera to capture 2D images, and an RGB camera.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

In some implementations, the chassis, or individual components within the chassis, may involve a mechanical support structure with releasable locking mechanisms. Examples of such releasable locking mechanisms are provided below with reference to FIGS. 6-10. Although these mechanisms are described with reference to the lamp-resembling ARFN, such mechanisms may be used.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification. Additionally, the microphones 218 may be used to receive audio input from the user, in the form of voice commands or conversation. The ARFN may be equipped with speech recognition and natural language processing capabilities, or such functionality may reside on another computing system to process the audio input received by the ARFN.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
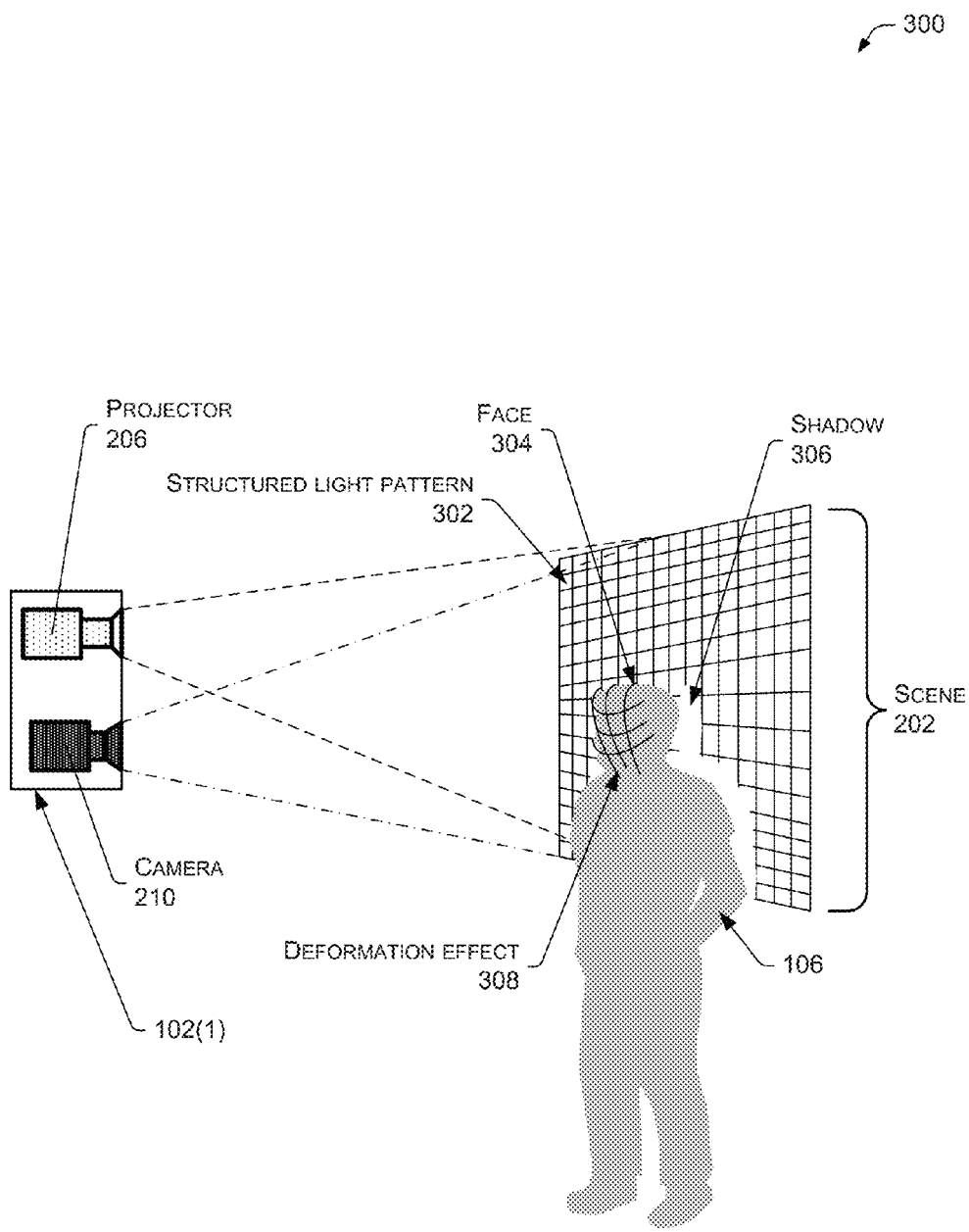
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202. In some implementations, multiple cameras may be used to acquire the image. Further, in some implementations, depth sensors may be used to determine distances to the various objects in the scene for use in characterizing or imaging the scene. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

In the implementations of FIGS. 2 and 3, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector and camera to share a common optical path. In this design, the form factor may be reduced. In the example shown in FIG. 1, the ARFNs 102(2) and 102(3) are embodied to resemble common table lamps, where the projector and camera reside in a head component of the lamp that is supported and positioned by a support structure.

Figure 4:
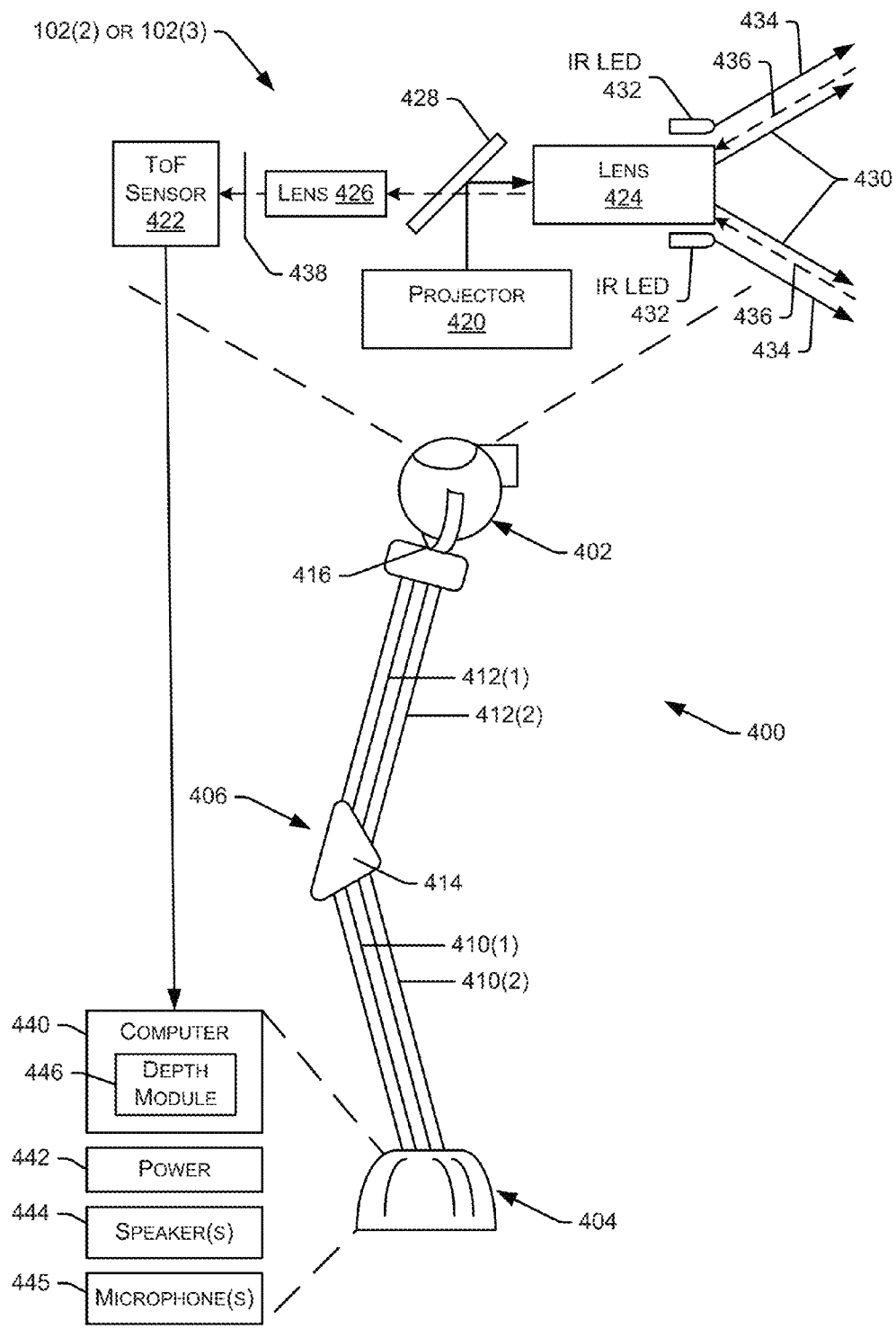
FIG. 4 shows a second implementation of a projection and image capture system formed as a familiar type of furniture, such as a table lamp. In this implementation, the projector and camera are arranged in a housing, which is formed as a head component of the lamp-resembling structure. The projector and camera share a common optical path through a common lens. The housing, or head component, is supported by a first implementation of a repositionable support structure.

FIG. 4 shows one implementation of the ARFN 102(2) or 102(3), implemented to resemble a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable support structure 406. As illustrated, the arm mechanism 406 has two base structural members or rods 410(1) and 410(2) connected to two head structural members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). In other implementations, the head 402 may be mounted to the arm mechanism 406 in a fixed manner, with no movement relative to the arm mechanism 406, or in a manner that enables more or less than two degrees of freedom.

The head 402 holds several components, including a projector 420 and a time of flight (ToF) sensor 422. In this example, the ToF sensor 422 measures IR signal reflections from objects within the scene. The ToF sensor 422 may be implemented as a standalone sensor, or as part of a camera. The head also contains one or more lenses, including a first lens 424 and a second lens 426. The first lens 424 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 424 may further include a motorized focus, a motorized zoom, and a motorized iris.

The second lens 426 is provided to adjust for the differences between the projection imager and the ToF imager. This allows for the device to set relative coverage of the two imagers (e.g., overscan/underscan).

The projector 420 projects an image that is reflected off an angled beam splitter 428 and out through the lens 424. The beam splitter 428 may be, for example, embodied as a dichroic beam splitter having a coated prism assembly that employs dichroic optical coatings to divide light. The projected image has a field of view represented by the outgoing pair of arrows 430. In this manner, the visible and high intensity light from the projector can be zoomed for image projection on a wide range of surfaces, from near view to far view surfaces.

One or more IR emitters 432, such as IR LEDs, are positioned in the head 402 relative to the lens 424. The IR emitters 432 direct IR light in the direction of the projected image to illuminate the scene onto which the images are being projected. The IR emitters 432 may be arranged such that the illumination field is wider than the projected field, as represented by the outgoing pair of arrows 434. While IR emitters are illustrated, other forms of illumination components may be used to emit visible or non-visible light into the environment.

The IR signals are reflected from objects in the scene and returned to the lens 424, as represented by the incoming pair of arrows 436. The captured IR signals are passed through the lens 424 and through the dichroic beam splitter 428 to the secondary lens 326. The IR signals are then optionally passed through an IR filter 438 (or other filter type) to the ToF sensor 422. In other implementations, the IR signals may be passed directly from the lens 426 to the ToF sensor 422, without going through the IR filter 438. Accordingly, the IR signals are emitted out from the head 402, scattered by the objects, and collected by the head 402 for capture by the ToF sensor 422 as a way to image the scene. This technique is performed in lieu of using structured light, as implemented in the implementation of the first ARFN 102 (1).

It is noted that, in other implementations, the projector 420 may be arranged to project an image that is passed through the beam splitter 428 and out through the lens 424, rather than being reflected by the beam splitter 428. In this arrangement, the returning IR signals maybe received back through the lens 424 and reflected by the beam splitter 428 to the lens 426 and ToF sensor 422. Said another way, the projector 420 and IR components (i.e., ToF sensor 422, lens 426 and optionally filter 438) may be swapped so that the returning IR signals are reflected by the beam splitter 428 rather than the projected image. Other arrangements may also be possible where at least part of the optical path is shared by the projection and depth capture.

The lamp-based ARFN 102(2) or 102(3) may also be equipped with one or more components in the base 404. In this example, a computer 440 resides in the base 404, along with power components 442, one or more speakers 444, and one or more microphones 445. The computer may include processing and memory to execute instructions. A depth module 446 may be executed by the computer 440 to measure a time of flight for an IR signal (or other modulated light output). The time-of-flight value may be derived as a function of a time lapsed between emission from an IR LED 432 and capture by the ToF sensor 422. Alternatively, the time-of-flight value may be derived as a function of the phase difference between the modulated light output and the returned light. The depth module may be implemented in software or hardware. It is noted that in other implementations, the components shown as residing in the base 404 may reside in the head 402 or arm mechanism 406. For instance, the computer 440 may be located in the head, and the speakers may be 444 may be distributed in multiple locations, including the base, arm mechanism, and/or the head.

Notice that in this implementation of FIG. 4, the projector 420 and the sensor 422 share a common optical path through a common lens 424. As a result, the ARFN may be made more compact to a smaller form factor, as one set of lenses are removed in this design as compared to the offset design for FIG. 2.

Figure 5:
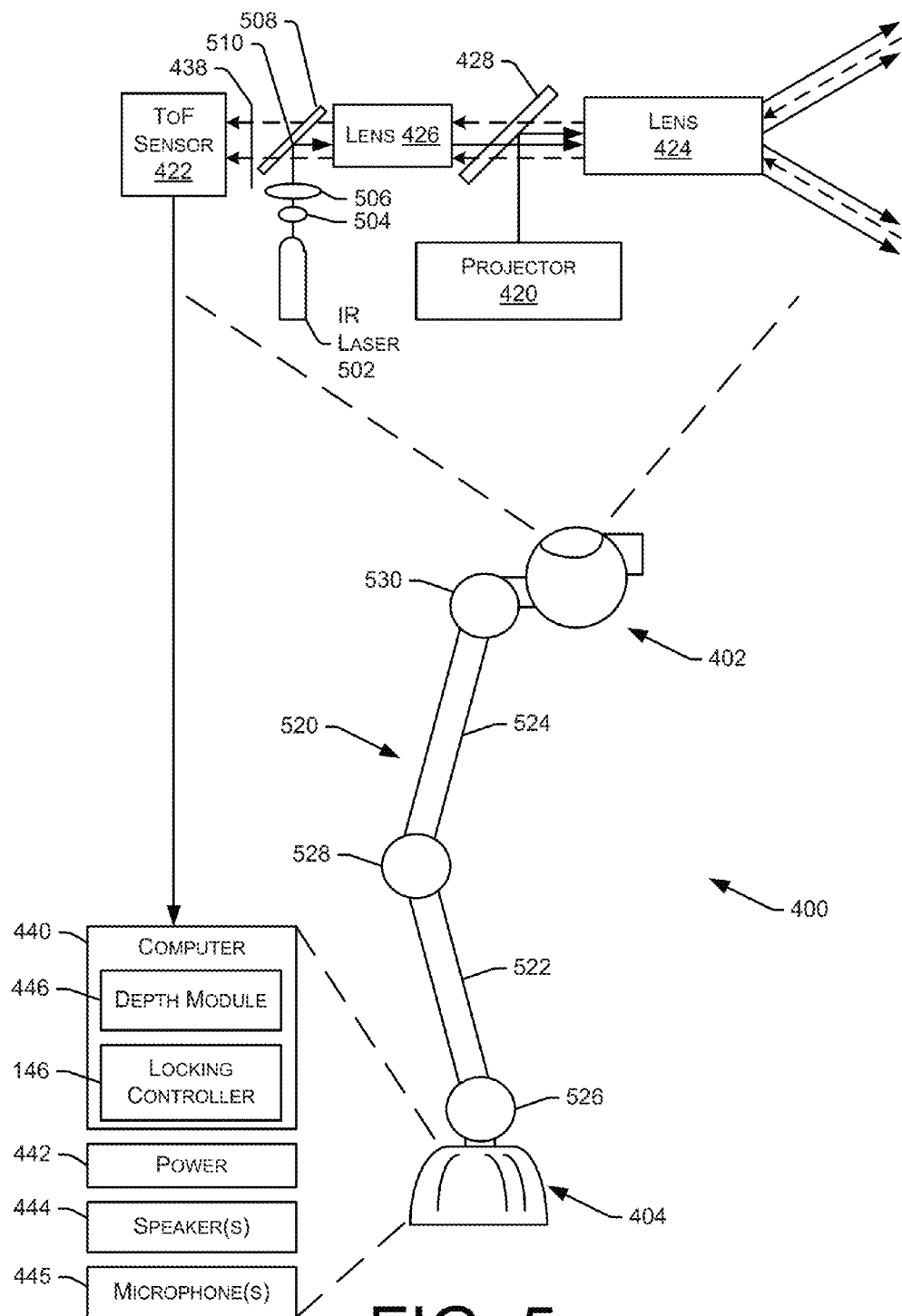
FIG. 5 shows a third implementation of a projection and image capture system, which is formed as a table lamp similar to the embodiment of FIG. 4. In this implementation, the projector and camera are formed in the head component and share a common optical path through a common lens, and illumination components also share the same optical path. Further, the head component is supported by another implementation of the repositionable support structure.

FIG. 5 shows another implementation of the ARFN 102(2) or 102(3), also shown implemented to resemble a table lamp 400. This implementation differs from that of FIG. 4 in that the illumination system also shares the same optical path as the projector 420 and the ToF sensor 422.

In FIG. 5, an IR laser 502 is used in place of the IR LEDs 432 of FIG. 4. The IR laser 502 outputs an IR beam that is expanded by a beam expander 504 and then concentrated by a focus lens 506 onto an angled beam splitter 508. In one implementation, the angled beam splitter 508 is formed of a material that passes light (e.g., glass) and has a reflective patch 510 at its center. The focus lens 506 concentrates the IR beam onto the reflective patch 510 of the beam splitter 508, which directs the beam through lens 426, through the beam splitter 428, and out through the lens 424. The reflective patch covers the center portion of the beam splitter 508 and may have any number of shapes, such as circular, oval, polygonal, and so forth. With this arrangement, the size and area of interest can be controllably illuminated by use of the lens 424 and modulated IR laser light. The illuminated area is roughly the same size, or slightly larger, than the area onto which images are projected.

IR signals reflected from a populated landscape are collected by the head 402 and passed back through the lens 424, through the beam splitter 428, through lens 426, through the non-reflective portion of the angled reflector 508, through the filter 438, and to the ToF sensor 422. Accordingly, the collected IR light forms an image on the ToF sensor 422 that is used to compute time of flight values for depth analysis of the landscape of the scene.

One of the advantages of placing the IR laser 502 as shown and passing the IR beam through the lens system is that the power used for illumination may be reduced as compared to the implementation of FIG. 4, where the IR LEDs are external to the optical path. Illumination typically degrades inversely proportional to the square of the distance. In FIG. 4, the forward and return paths result in an illumination inversely proportional to the distance to the power of four. Conversely, illumination through the same lens means that the returned light is inversely proportional to square of the distance, and therefore can use less stronger illumination to achieve the same results.

It is further noted that essentially any IR device may be used in these systems. Although IR LEDs and IR lasers are shown in the implementations of FIGS. 4 and 5, essentially any device that produces energy within the IR spectrum may be used, such as, for example, a regular red LED.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

In FIG. 5, the table lamp 400 is further modified to support the head 402 with a repositionable support structure 520 that the user may elect to move to any desired position so that the head 402 may be oriented as desired for projection and image capture. The support structure 520 includes a first or lower arm 522 and a second or upper arm 524. The arms 522 and 524 are connected to each other and to the head 402 and base 404 through a set of joints, including a first or base joint 526, a second or middle joint 528, and a third or head joint 530. The joint 526-530 may be configured in any number of ways, to permit one or more degrees of movement.

In certain implementations, at least one or more of the arms 522-524 and the joints 526-530 is configured to controllably lock the support structure into a stationary position so that the head 402 is held in a stable orientation for purposes of projection, depth sensing, and/or image capture. One or more locking mechanisms may be used and such mechanisms may be positioned in one or more of the arms or joints. The locking mechanisms may be configured to be controllably unlocked in response to detection of a user input indicative of user intent to move the head 402. The user input may be expressed in any number of ways, including touch, activation of a switch or button, or a verbal command.

The locking controller 146 is configured to detect the user input and release the locking mechanisms into an unlocked state to permit easy repositioning of the support structure. When the user is completed, the locking controller 146 resets the locking mechanism in a locked state so that the support structure becomes rigid and fixed to provide stationary and stable support for the projector and imaging components in the head 402. The locking mechanisms may be implemented in any number of ways, and several example implementations are shown and described below with reference to FIGS. 6-10.

Figure 6:
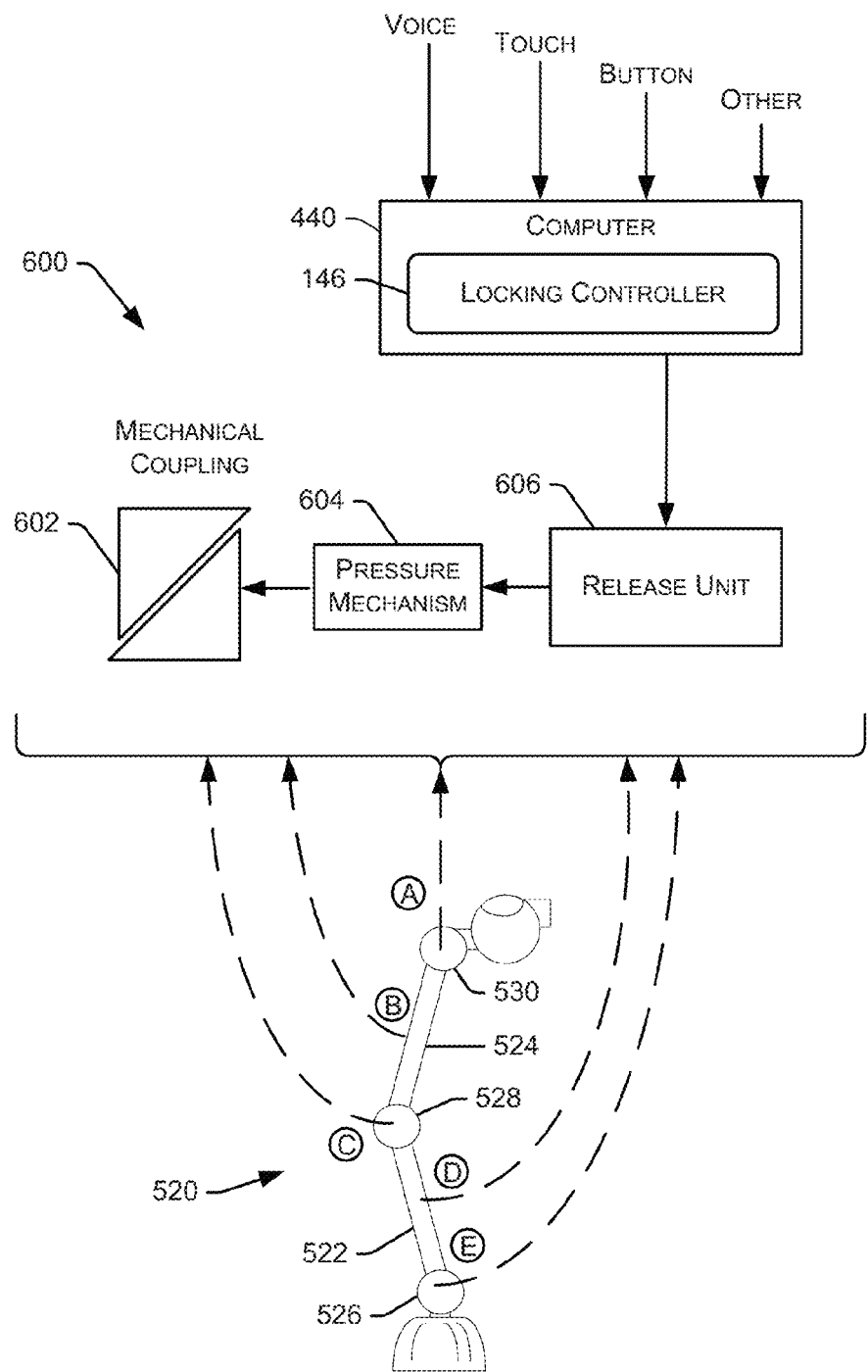
FIG. 6 shows various examples of releasable brakes that may be employed individually or corporately in the repositionable support structure of FIG. 5.

FIG. 6 shows various examples of releasable brakes 600 that may be employed individually or corporately in the repositionable support structure 520. The brakes may be used as the locking mechanism components in the various arms and joints. As shown, a releasable brake component may be provided in the head joint 530 as indicated by configuration option "A", a releasable brake component may be provided in the upper arm 524 as indicated by configuration option "B", a releasable brake component may be provided in the middle joint 528 as indicated by configuration option "C", a releasable brake component may be provided in the lower arm 522 as indicated by configuration option "D", and a releasable brake component may be provided in the base joint 526 as indicated by configuration option "E". The support structure 520 may be configured with any combination of options A-E.

Generally, the releasable brakes 600 include a mechanical coupling 602 that forms the stopping element to prevent movement in the associated joint or arm. The mechanical coupling 602 may be in the form of a friction surface (e.g., two disks, cone inside cone, etc.), a structural interface (e.g., gears, screw member, serrated teeth, etc.), electromagnetic material (e.g., memory metal, ferrofluid, magnetorheological fluids, etc.), and so on. Depending upon implementation, the mechanical coupling 602 may be held or biased in a locked state by a pressure mechanism 604. The pressure mechanism 604 may be mechanical (e.g., spring), pneumatic, hydraulic, electric, and the like. A release unit 606 may further be provided in some implementations to release or otherwise disengage the pressure mechanism 604 to release the mechanical coupling 602. The release unit 606 may include a solenoid, motor, electromagnetic component, and so forth.

The locking controller 146 is operably connected to the releasable brakes 600, and namely the release unit 606, to selectively set and release the mechanical coupling 602. The locking controller 146 is responsive to any number of user inputs that may indicate a user's desire or intention to reposition the support structure 520. As one example, the user may speak a verbal command (e.g., a key word such as "release" or "unlock" followed by "support structure"). The computer 440 may be equipped with sufficient speech recognition and/or natural language processing to understand this input, and the locking controller 146 directs the release unit 606 to alternately unlock or lock the support structure 520.

In another example, the user may simply touch the support structure 520. In this case, the human touch may trigger a capacitive sensor or switch that is used as input to the release unit 606. Upon human contact on the support structure 520, the release unit 606 unlocks the mechanical coupling 602 to allow the user to easily reposition the head 402 of the support structure 520. When the user stops touching the structure 520, the release unit 606 once again locks the support structure by reengaging the mechanical coupling 602.

In still another example, the user may press a button or actuate a switch that is dedicated or programmatically assigned to control the locking components 600 of the support structure 520. In response to the user's action, the locking controller 146 directs the release unit 606 to unlock the mechanical coupling 602 to allow the user to move and orient the head 402 of the support structure 520. When the user presses the button or switch a second time, the release unit 606 allows the mechanical coupling 602 to reengage, thereby locking the support structure 520.

The voice, touch, and button inputs are merely examples, and many other types of user inputs may be detected and used to release and reset the lock(s) on the support structure. For instance, a human gesture may be used.

Furthermore, where multiple releasable brakes are used, the locking controller 146 may be configured to interpret the user input as pertaining universally to all of the releasable brakes in the support structure 520. For instance, if the user provide a verbal command or touches the head 402 or presses a button, the locking controller 146 may direct all of the brakes associated with any of the joints and arms to transition to an unlocked state. When the user speaks a new command or stops touching the structure or presses the button again, the locking controller 146 resets all of the brakes to a locked state.

Alternatively, the locking controller 146 may be configured to associate the user input to a subset of one or more brakes. For instance, suppose the user touches the upper arm 524 and the user input is sensed by a capacitive sensor. The locking controller 146 may interpret this action as a desire to move the upper portion of the support structure and hence direct any of the brakes associated with the arm 524 and/or the head joint 530 and middle joint 528 to be unlocked. Meanwhile, any brakes associated with the lower arm 522 and/or the base joint 526 may remain locked.

Figure 7:
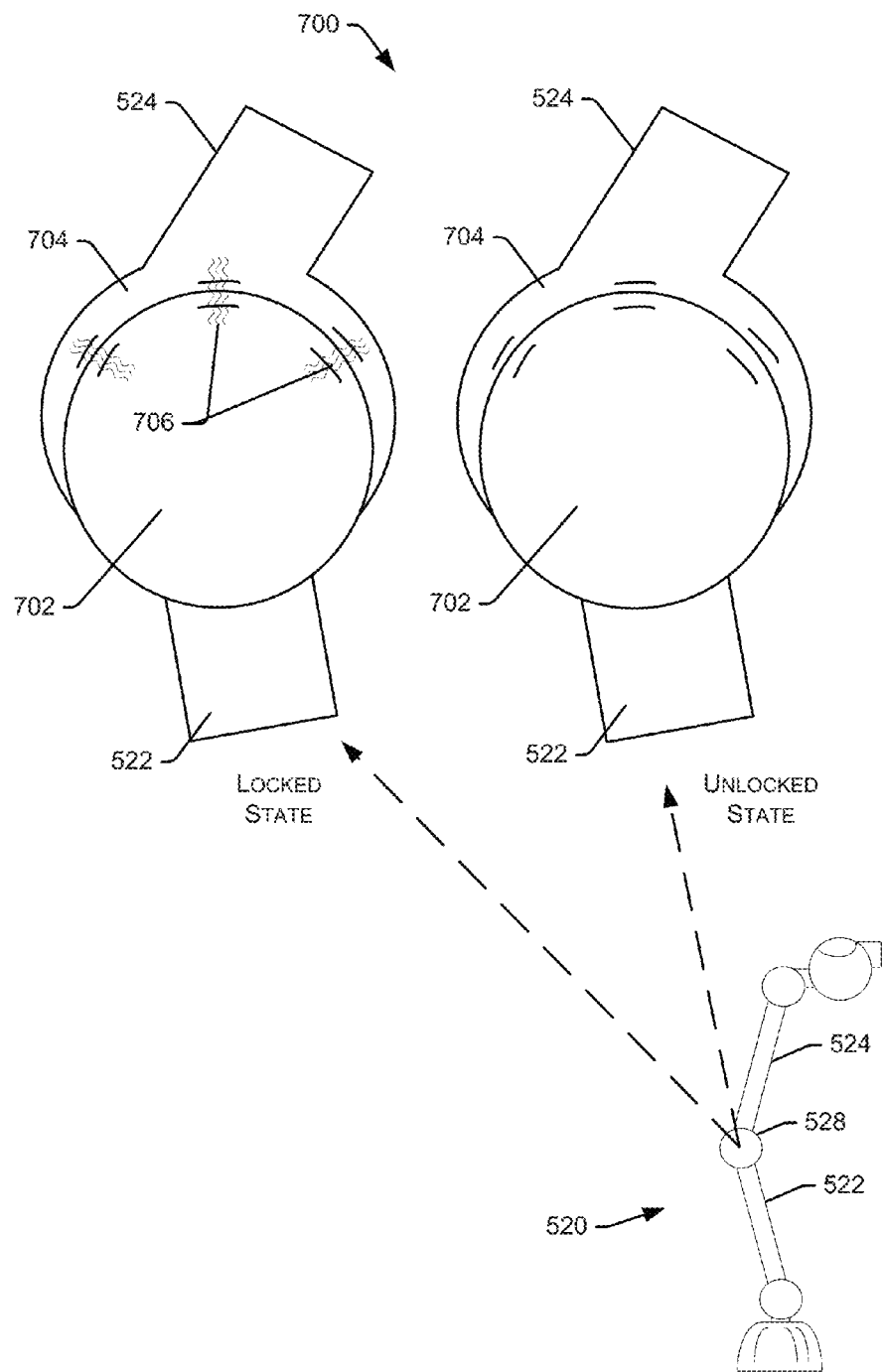
FIG. 7 illustrates a first implementation of a releasable brake formed at a joint of the support structure of FIG. 5.

FIG. 7 shows a first implementation of a releasable brake component 700 formed at a joint, such as middle joint 528, of the support structure 520. The brake component 700 is shown in a first or locked state and a second or unlocked state. In this implementation, the joint 528 is constructed as a ball and socket joint, where a ball member 702 is movably mounted within a corresponding and complementary socket member 704. The ball member 702 may be physically coupled to a portion of the support structure, such as the lower arm 522, while the socket member 704 is physically coupled to another portion of the support structure, such as the upper arm 524.

The releasable brake component 700 of the joint 528 may be further configured with an electromagnetic element that "freezes" the ball and socket joint in a locked state upon application of an electrical or magnetic field, as represented by the wavy lines 706. To lock the ball and socket joint, a field is applied. To release the ball and socket joint, the field is removed. In one implementation, a ferrofluid material is used in the joint to alternately transition between liquid and solid depending upon presence or absence of the field 706. When in a liquid state, the joint is in an unlocked state and freely movable. When the material is in a solid state, the joint is in a locked state. In another implementation, magnetic pieces are formed in the ball 702 and socket 704 so that upon application of a magnetic field 706, the ball and socket are held in fixed position relative to one another.

Figure 8:
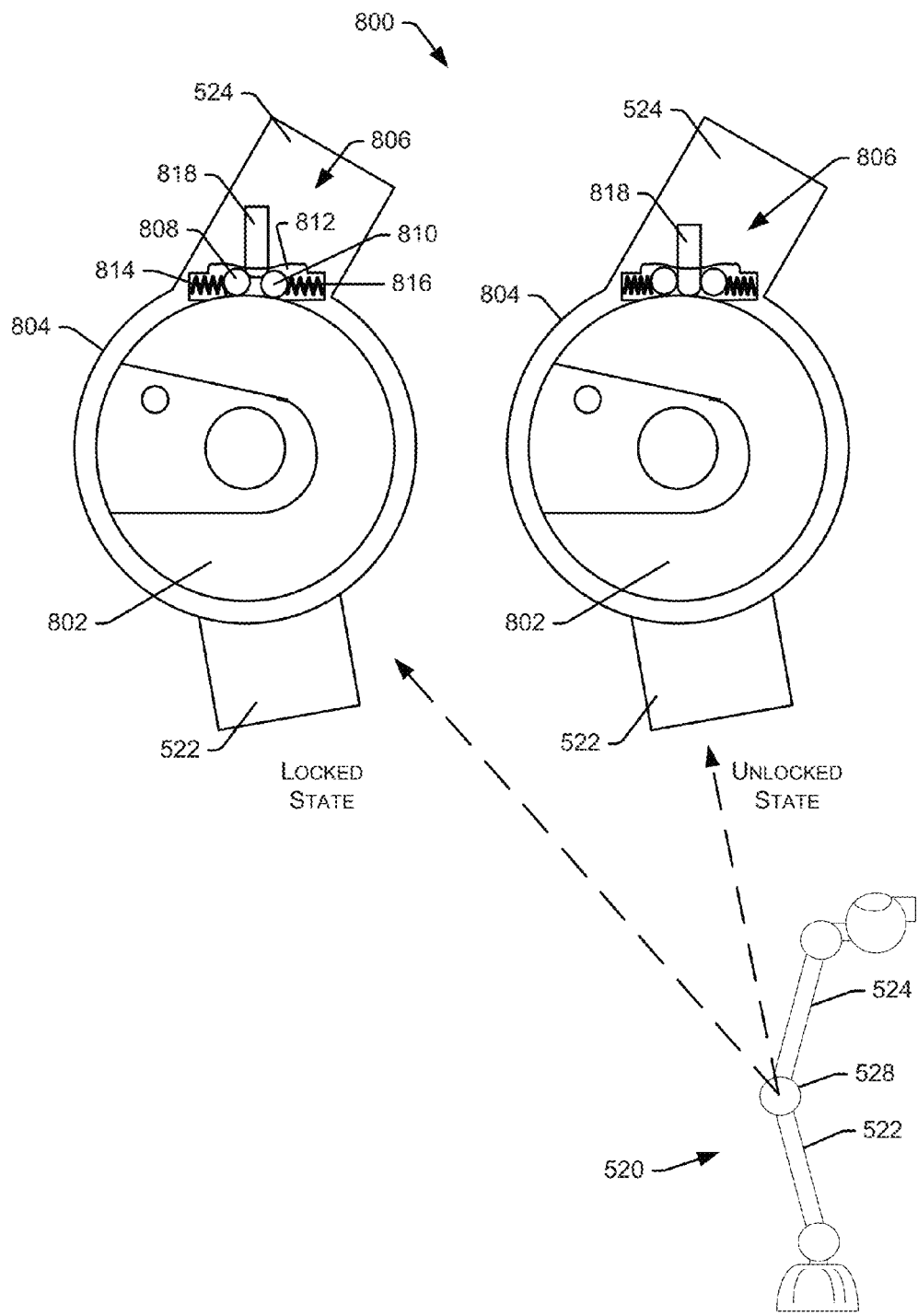
FIG. 8 shows a second implementation of a releasable brake formed at a joint of the support structure of FIG. 5.

FIG. 8 shows a second implementation of a releasable brake component 800 formed at a joint, such as the middle joint 528, of the support structure 520. The joint 528 includes an internal member 802 that may be formed as a cylindrical member fixedly coupled to the lower arm 522. The internal member 802 is rotatably mounted within an external member 804 that encloses the internal member 802. The external member 804 is fixedly coupled to the upper arm 524. In FIG. 8, the releasable brake component 800 is in the form of a dual clutch locking mechanism 806 which prevents rotation of the internal member 802 relative to the external member 804 in either direction. The dual clutch locking mechanism 806 further includes two jamming cylinders 808 and 810 arranged in a chamber 812, two associated springs 814 and 816 to bias the jamming cylinders to a locked position, and a slidable piston member 818. In this implementation, the jamming cylinders 808 and 810 have an elongated cylindrical shape with center axes that run parallel to a center access of the internal member 802. In other implementations, the jamming cylinders 808 and 810 may be replaced by one or more ball bearings or other movable elements.

In the locked state, the piston member 816 is retracted, allowing the springs 814 and 816 to bias the jamming cylinders 808 and 810 into the narrow area of the chamber 812. This pressure from the springs 814 and 816 cause the jamming cylinders 808 and 810 to "wedge" or "jam" into the narrow area of the chamber 812 and thereby contact and create friction with the internal member 802 and external member 804. The friction prevents the rotation of the members relative to one another.

In the unlocked state, the piston member 816 is moved to an extended position, pressing the jamming cylinders 808 and 810 apart from one another, causing the springs 814 and 816 to be compressed. When the piston member 816 is extended, the jamming cylinders 808 and 810 are moved to the wider areas of the chamber 812, which allows the jamming cylinders to move more freely and lose contact with the internal member 802 and/or external member 804. In this unlocked state, the internal member 802 is able to rotate relative to the external member 804 in either direction.

Figure 9:
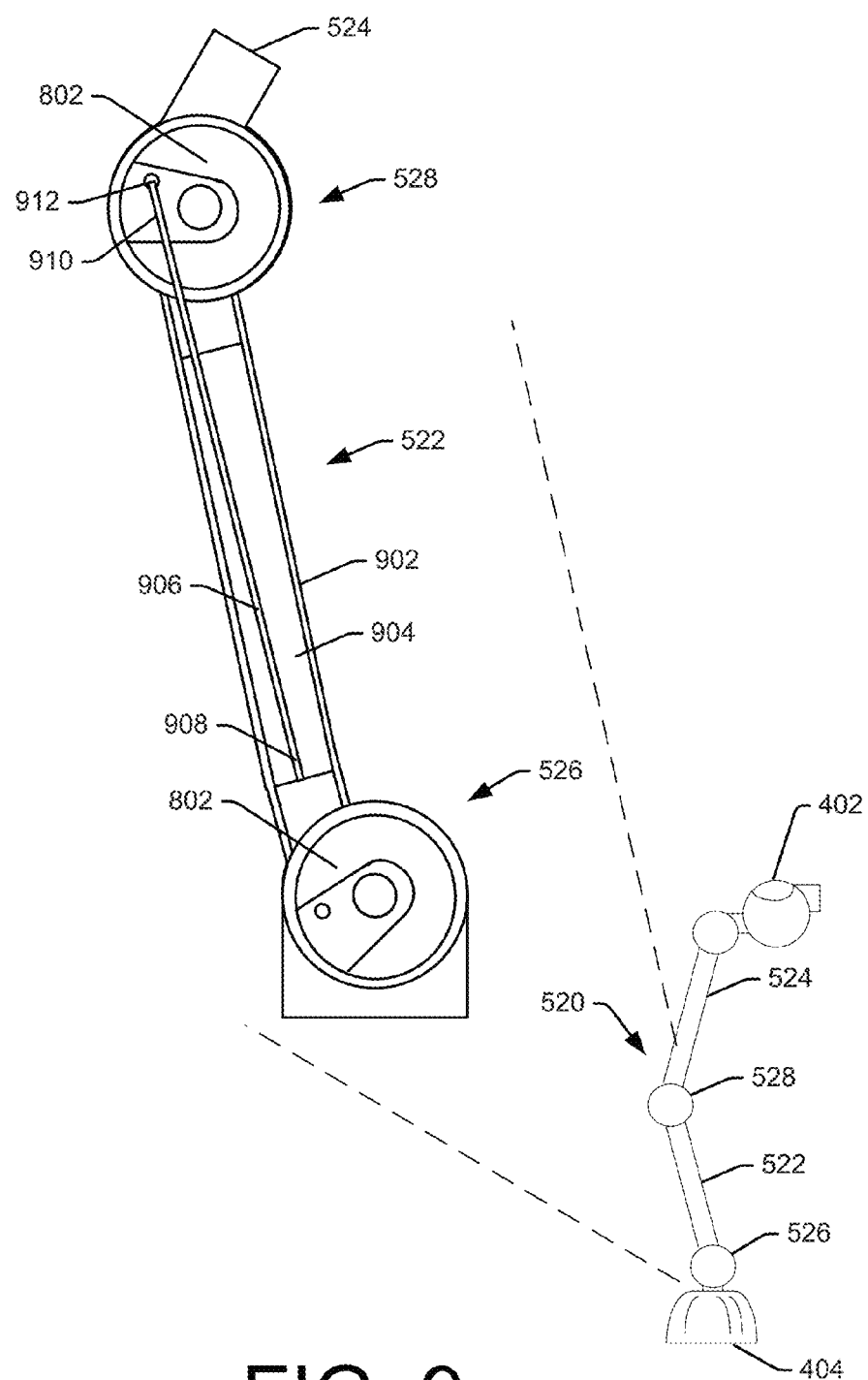
FIG. 9 depicts the support structure of FIG. 5 with an internal linkage formed as part of an arm portion of the structure that is used in conjunction with the brake according to another implementation.

FIG. 9 depicts another aspect of the support structure 520 where the arms 522 and 524 are each equipped with an internal parallel linkage to provide a mechanical leveling functionality for the head 402 as one arm is moved. In this illustration, an enlarged view of the lower arm 522 between the middle joint 528 and base joint 526 is shown. The lower arm 522 has a structural member 902 that is formed as a hollow, rigid body that is shown in cutaway to reveal an internal cavity 904. A linkage 906 is mounted to extend through the arm cavity 904. The linkage 906 has a first or bottom end 908 that is fixedly connected to the base joint 526 and particularly, to the inner member 802 of the joint 526 that connects to the arm 522. The linkage 906 also has a second or top end 910 that is rotatably connected to the middle joint 528 and namely, to a pivot 912 at the inner member 802 of the joint 528 that connects to the upper arm 524.

According to this construction, when the releasable brakes in the joints 526, 528 and/or arm 522 are in an unlocked state, the user may move the lower arm 522 relative to the base 404 as facilitated by the base joint 526. As the lower arm 522 is rotated about the base joint 526, the linkage 906 causes a corresponding rotation of the inner member 802 in the middle joint 528. A similar linkage is provided in the upper arm 524. As a result, as the user moves the support structure, the linkage 906 cause the position of the head 402 to remain approximately constant throughout the movement.

Figure 10:
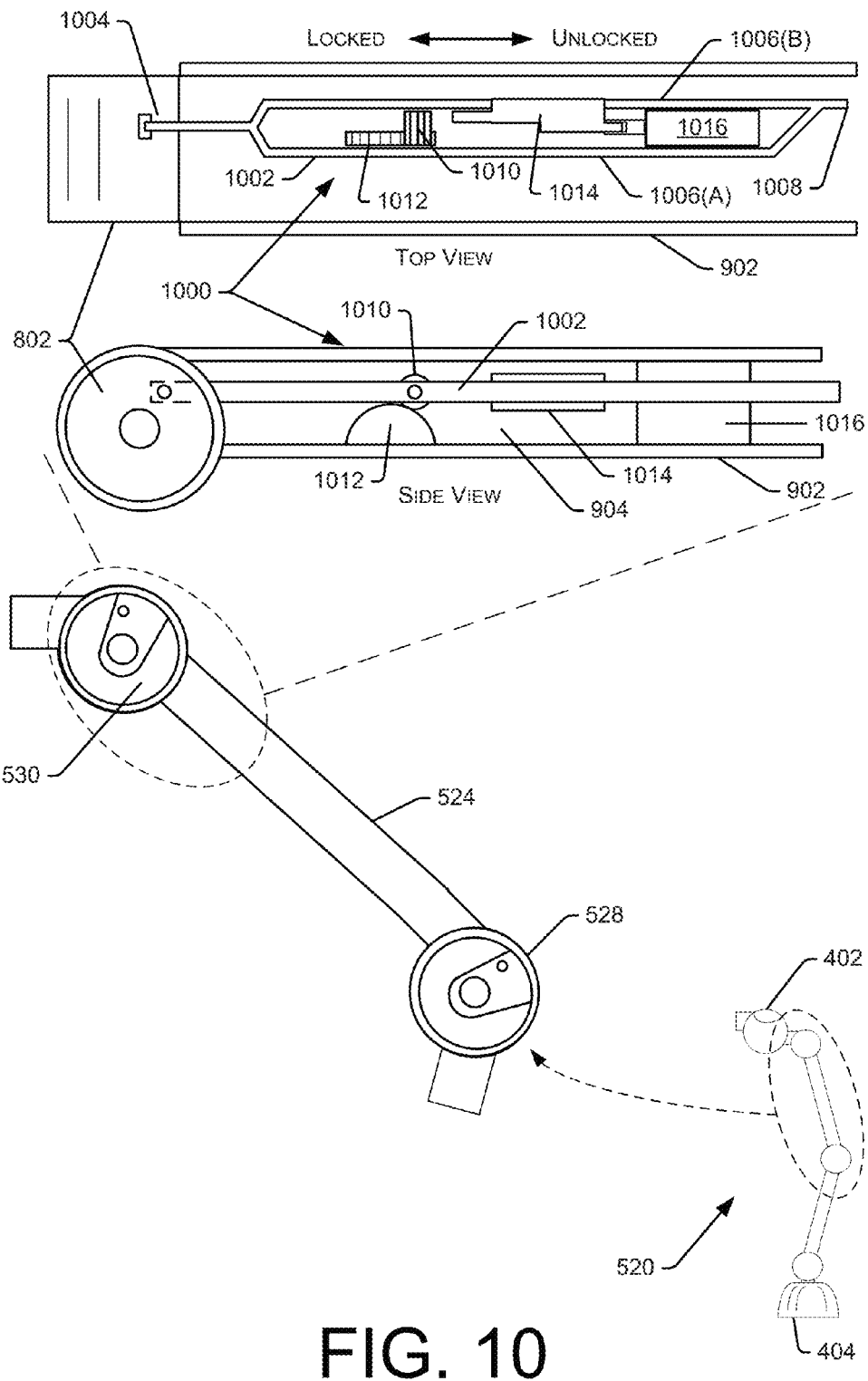
FIG. 10 illustrates a third implementation of a releasable brake formed in the arm of the support structure.

FIG. 10 illustrates a third implementation of a releasable brake component 1000 formed in an arm, such as the upper arm 524, of the support structure 520, in conjunction with the parallel linkage. In this implementation, the brake component 1000 is in the arm as opposed, or in addition, to brake component(s) in one or more of the joints.

In FIG. 10, an enlarged view of the upper half of the support structure 520 is shown. This view includes the upper arm 524, middle joint 528, and the head joint 530. Moreover, further enlarged side and top views of a portion of the upper arm 524 and the head joint 530 are illustrated for purposes of describing an arm-based brake component 1000. As shown in the enlarged side and top views, the structural member 902 of the arm 524 defines a hollow cavity 904. A side wall of the structural member 902 is removed in the side view and a top wall of the structural arm member 902 is removed in the top view for purposes of illustration.

A portion of a linkage 1002 is shown extending through the cavity 904, with one end 1004 of the linkage 1002 attached to the inner member 802 of the head joint 530. As shown in the top view, the linkage 1002 includes a dual beam section 1006 of parallel beams 1006(A) and 1006(B) that extend between the end 1004 and a unitary beam section 1008. Between the parallel beams 1006(A) and 1006(B) is the releasable brake 1000. In this implementation, the brake 1000 includes a pinion gear 1010 rotatably mounted between the parallel beams 1006(A) and 1006(B) and having gear teeth engaged with a semicircular rack 1012 mounted to the structural arm body 902. The arc or radius of the semicircular rack 1012 is configured to match a path that the pinion gear 1010 travels as the arm 524 is moved.

A pinion lock 1014 is slidably mounted to one beam 1006(B) of the linkage 1002 to alternately engage and release the pinion gear 1010. A solenoid or other motor 1016 is coupled to the pinion lock 1014 via a piston to slide the pinion lock 1014. When the solenoid 1016 extends the piston, the pinion lock 1014 is slid to a locked position where the pinion lock 1014 engages the pinion gear 1010. In this locked position, the pinion gear 1010 is fixed between the pinion lock 1014 and the semicircular rack 1012, and the arm 524 is locked in place. When the solenoid 1016 retracts the piston, the pinion lock 1014 is slid to an unlocked position where the pinion lock 1014 is separated from the pinion gear 1010. In this unlocked position, the pinion gear 1010 is free to move along the rack 1012, thereby allowing the arm 524 to move.

Figure 11:
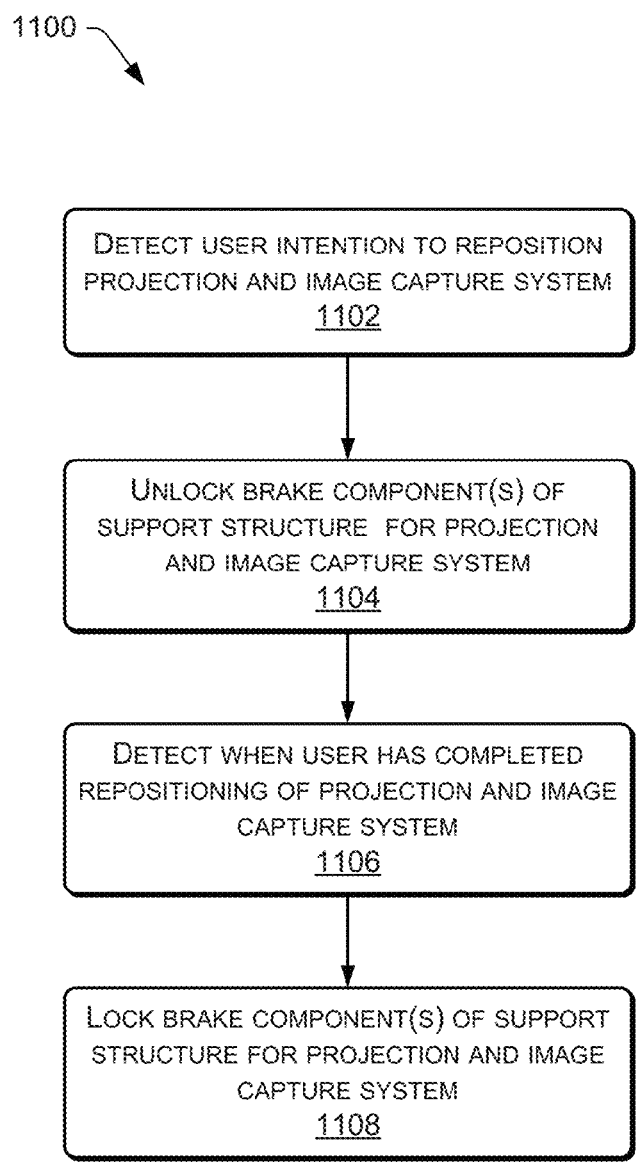
FIG. 11 shows an illustrative process of repositioning a projection and image capture system using the support structure.

FIG. 11 shows an illustrative process 1100 of repositioning a projection and image capture system using the support structure. The process described herein may be implemented by the architectures described herein, or by other architectures. This process is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1102, user intention to reposition the projection and image capture system is detected. This may be accomplished in many different ways. For instance, the user may speak a command, or touch the support structure, or press a button or switch, or make a gesture. In each case, the user provides an input that may be deduced as an intention to reposition the system.

At 1104, all or some of the brake components of the support structure are unlocked. When in an unlocked state, the support structure may be freely moved with little force. The user may then reposition and orient the projection and image capture system as desired. For instance, the user may position the head 402 of the ARFN 102(2) to direct it toward a table or the head 402 of the ARFN 102(3) to direct it toward a portable display screen as shown in FIG. 1.

At 1106, the process detects when the user has completed repositioning the system. This may be detected by sensing when the user ceases touching the structure, or upon receipt of another verbal command, or upon further activation of a switch or button, or another gesture.

At 1108, all or some of the brake components of the support structure are locked. When in a locked state, the support structure is once again rigidly set to hold the system in a stationary and stable position.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
   a housing including a plurality of components comprising:
   an infrared (IR) emitter to emit non-visible light into at least a portion of an environment;
   a lens having an associated optical path;
   a projector to project images onto a surface of the environment, the projector configured to project the images along at least a portion of the optical path associated with the lens; and
   a depth sensor to receive at least a portion of the non-visible light from the IR emitter reflected by one or more objects in the environment, the depth sensor configured to generate data associated with distances to the one or more objects in the environment;

a support structure to support the housing, the support structure having at least one arm connected to at least one joint, wherein the arm may be moved about the joint to reposition the housing;

a releasable brake provided in at least one of the arm or the joint to alternately lock the support structure in a stationary position or unlock the support structure to permit repositioning of the housing; and locking controller configured to receive a user input to unlock the support structure and in response, to cause the releasable brake to unlock the support structure.

2. The device of claim 1, wherein the joint further comprises a ball and socket joint with a ball member and a socket member and the releasable brake is configured to fix the ball member within the socket member upon application of at least one of an electrical field or an electromagnetic field.

3. The device of claim 1, wherein the joint further comprises an internal member rotatably mounted within an external member, and the releasable brake comprises a dual clutch mechanism to prevent rotation of the internal member relative to the external member when in a locked state.

4. The device of claim 1, wherein:
the at least one joint comprises first and second joints;
the arm of the support structure comprises a structural member and a linkage separate from the structure member; and
wherein the structural member and the linkage of the arm extend between the first and second joints, and the linkage is attached to the first and second joints to move relative to the structural member when the support structure is repositioned, wherein the releasable brake is configured to prevent movement of the linkage relative to the structural member when the releasable brake is in a locked position.

5. The device of claim 1, wherein the user input comprises at least one of: (1) a human touch input on the support structure or pressing a button, and the locking controller is configured to detect the human touch input or actuation of the button and unlock the support structure in response, or (2) a verbal command, wherein the device further comprises at least one microphone to receive the verbal command, and the locking controller is configured to detect the verbal command and unlock the support structure in response.

6. A system comprising:
a projector to project an image into an environment;
a support structure to support the projector and to facilitate repositioning of the projector, the support structure being configured to: (i) rest in a locked state where the support structure maintains the projector in a stationary position at a first location, and (ii) transition to an unlocked state, the support structure being movable to reposition the projector to a second location when the support structure is in the unlocked state;
a releasable brake operably coupled to the support structure, the releasable brake configured to alternately lock the support structure in the locked state or unlock the support structure to transition to the unlocked state; and
a locking controller operably coupled to the releasable brake, the locking controller configured to receive input, and in response to receiving the input, cause the releasable brake to unlock the support structure.

7. The system of claim 6, further comprising:
a lens having an associated optical path;
the projector being configured to project the image through the lens along at least a portion of the optical path;
an illumination component to generate light to illuminate an area within the environment; and
a camera to receive light scattered from the illuminated area along at least a portion of the optical path such that the projected image and the received light share at least a portion of the optical path.

8. The system of claim 6, wherein the support structure comprises:
first and second joints; and
an arm extending between and operably connected to the first and second joints,
wherein the releasable brake is provided in at least one of the first joint, the second joint, or the arm, the releasable brake being biased to lock the support structure in the locked state.

9. The system of claim 6, wherein the support structure comprises:
at least one joint to permit movement of the support structure,
wherein the releasable brake is formed in the arm to alternately set the joint to prevent movement when the support structure is in the locked state and release the joint to allow movement of the support structure when the support structure is in the unlocked state.

10. The system of claim 9, wherein the releasable brake comprises at least one of a mechanical component, a friction component, an electromagnetic component, a dual clutch mechanism, or use of a ferrofluid or magnetorheological fluid.

11. The system of claim 6, wherein the support structure comprises:
at least one arm,
wherein the releasable brake is formed in the arm to alternately prevent movement of the at least one arm when the support structure is in the locked state and to allow movement of the at least one arm when the support structure is in the unlocked state.

12. The system of claim 6, wherein the input comprises one of a touch input, pressing a button, a voice input, or a gesture input.

13. The system of claim 6, wherein the transition to the unlocked state is in response to movement of the projector to maintain projection of the image on a surface in the environment.

14. A support structure comprising:
a first joint and a second joint, the first joint being connected to a base;
an arm coupled to the first joint and to the second joint to support the second joint relative to the base, the arm being movable relative to the base via the first joint;
a releasable brake mounted in at least one of the first joint, the second joint, and the arm, the releasable brake being biased to hold the support structure in a locked state in which the arm, the first joint, and the second joint are maintained in a fixed position; and
a locking controller operably connected to the releasable brake, the locking controller configured to detect a user input to release the support structure from the locked state, wherein upon detection of the user input, the locking controller causes the releasable brake to release the support structure to transition from the locked state to an unlocked state.

15. The support structure of claim 14, wherein the releasable brake comprises a dual clutch mechanism provided in at least one of the first joint or the second joint.

16. The support structure of claim 14, wherein the releasable brake comprises an electromagnetic locking mechanism provided in at least one of the first joint or the second joint.

17. The support structure of claim 14, wherein the arm comprises a structural member and a linkage, the structural member extending between the first joint and the second joint, and the a linkage extending between the first joint and the second joint to move relative to the structural member when the support structure is moved, and the releasable brake comprises a mechanism to prevent movement of the linkage relative to the structural member.

18. A method comprising:
  detecting user input to reposition a projection and image capture system, the projection and image capture system being supported by a support structure having one or more brakes to prevent movement of the support structure when in a locked state;
  in response to detecting the user input, automatically unlocking at least one of the one or more brakes of the support structure to permit movement of the support structure and repositioning of the projection and image capture system;
  detecting subsequent user input associated with completion of repositioning the projection and image capture system; and
  in response to detecting the subsequent user input, automatically locking the at least one of the one or more brakes of the support structure to prevent movement of the support structure and hold the projection and image capture system in a stationary position.

19. The method of claim 18, wherein the user input comprises at least one of user touch on the support structure, actuation of a button, or a verbal command.

20. The method of claim 18, wherein the subsequent user input comprises at least one of removal of user touch on the support structure, actuation of a button, or a verbal command.

* * * * *